US006173349B1

(12) United States Patent
Qureshi et al.

(10) Patent No.: US 6,173,349 B1
(45) Date of Patent: *Jan. 9, 2001

(54) SHARED BUS SYSTEM WITH TRANSACTION AND DESTINATION ID

(75) Inventors: Amjad Z. Qureshi, San Jose; Le Trong Nguyen, Monte Sereno, both of CA (US)

(73) Assignee: Samsung Electronics Co., Ltd., Kyungki-do (KR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/731,393

(22) Filed: Oct. 18, 1996

(51) Int. Cl.[7] .................................................. G06F 13/36
(52) U.S. Cl. ........................ 710/110; 710/113; 710/107; 710/240; 710/241
(58) Field of Search ...................................... 395/290, 291, 395/293, 296, 298, 299, 728, 729, 731, 840, 841, 284, 287

(56) References Cited

U.S. PATENT DOCUMENTS

| 5,418,967 | * | 5/1995 | Simcoe et al. | 395/726 |
| 5,475,850 | * | 12/1995 | Kahn | 395/290 |
| 5,506,971 | * | 4/1996 | Gullette et al. | 395/296 |
| 5,533,204 | * | 7/1996 | Tipley | 395/288 |
| 5,535,363 | * | 7/1996 | Prince | 711/147 |
| 5,574,849 | * | 11/1996 | Sonnier et al. | 714/12 |
| 5,574,868 | * | 11/1996 | Marisetty | 395/298 |
| 5,613,075 | * | 3/1997 | Wade et al. | 395/287 |
| 5,649,209 | * | 7/1997 | Umetsu et al. | 395/739 |
| 5,737,546 | * | 4/1998 | Fenwick et al. | 395/290 |
| 5,802,055 | * | 9/1998 | Krein et al. | 370/402 |
| 5,835,739 | * | 11/1998 | Bell et al. | 710/128 |
| 5,925,120 | * | 7/1999 | Arp et al. | 710/131 |
| 5,937,171 | * | 8/1999 | Sarangdhar et al. | 710/105 |
| 5,941,973 | * | 8/1999 | Kondo et al. | 710/129 |

* cited by examiner

Primary Examiner—Ayaz R. Sheikh
Assistant Examiner—Raymond N Phan
(74) Attorney, Agent, or Firm—Skjerven Morrill MacPherson LLP; David T. Millers (57) ABSTRACT

To reduce latency on a shared bus during bus arbitration, a novel shared bus system uses device select lines between a bus arbiter and the bus devices to select the bus slave concurrently with the granting of the shared bus to the bus master. Specifically, a bus device requests the use of the shared bus by driving an active state on a bus request terminal and driving a destination ID value corresponding to the desired bus slave to the bus arbiter. The bus arbiter then drives an active state on a bus grant output terminal coupled to the bus grant input terminal of the requesting device. Concurrently, the bus arbiter drives an active state on the device select output terminal coupled to the device select input terminal of the desired bus slave. In addition posted read request tagging can be simplified using a transaction ID bus to supplement the shared bus.

13 Claims, 8 Drawing Sheets

SHARED BUS SYSTEM WITH TRANSACTION AND DESTINATION ID

BACKGROUND OF THE INVENTION

1. Field of the Invention

This invention relates to bus architectures and particularly to low latency shared bus architectures.

2. Description of Related Art

A bus is a communication path between various devices of an electronic system. For example in a computer system, the central processing unit (CPU) communicates with main memory through a memory bus. Peripheral devices may also be connected to the memory bus or connected to the CPU through a separate IO bus.

Buses can be divided into two general categories: point-to-point buses and shared buses. A point-to-point bus connects only two bus devices together. A shared bus can be used by more than two bus devices. Thus the number of buses required for communication depends on whether point-to-point or shared buses are used. For example, four bus devices require six point-to-point buses to communicate with each other, but four bus devices can communicate through a single shared bus. With a shared bus architecture all four bus devices can share a single bus.

Point-to-point buses have the advantage of lower latency, minimal bus contention, and the ability to support multiple simultaneous data transfers. However, the large number of buses used in a point-to-point bus architecture requires a large amount of chip or board area.

Since only a single shared bus can support multiple bus devices, the chip or board area required to implement a shared bus architecture is much less than is required by a point-to-point bus architecture. The primary disadvantage of the shared bus is that arbitration must be performed so that the bus devices can efficiently share the shared bus. Furthermore, device identification is necessary on the bus so that a bus device only receives or responds to signals directed towards that bus device.

With the increasing complexity of electronic systems, data buses have increased in width. The wide data buses preclude the use of many point-to-point buses when chip or board area is costly. Therefore, shared buses are commonly used in complex electronic systems.

Figure 1:
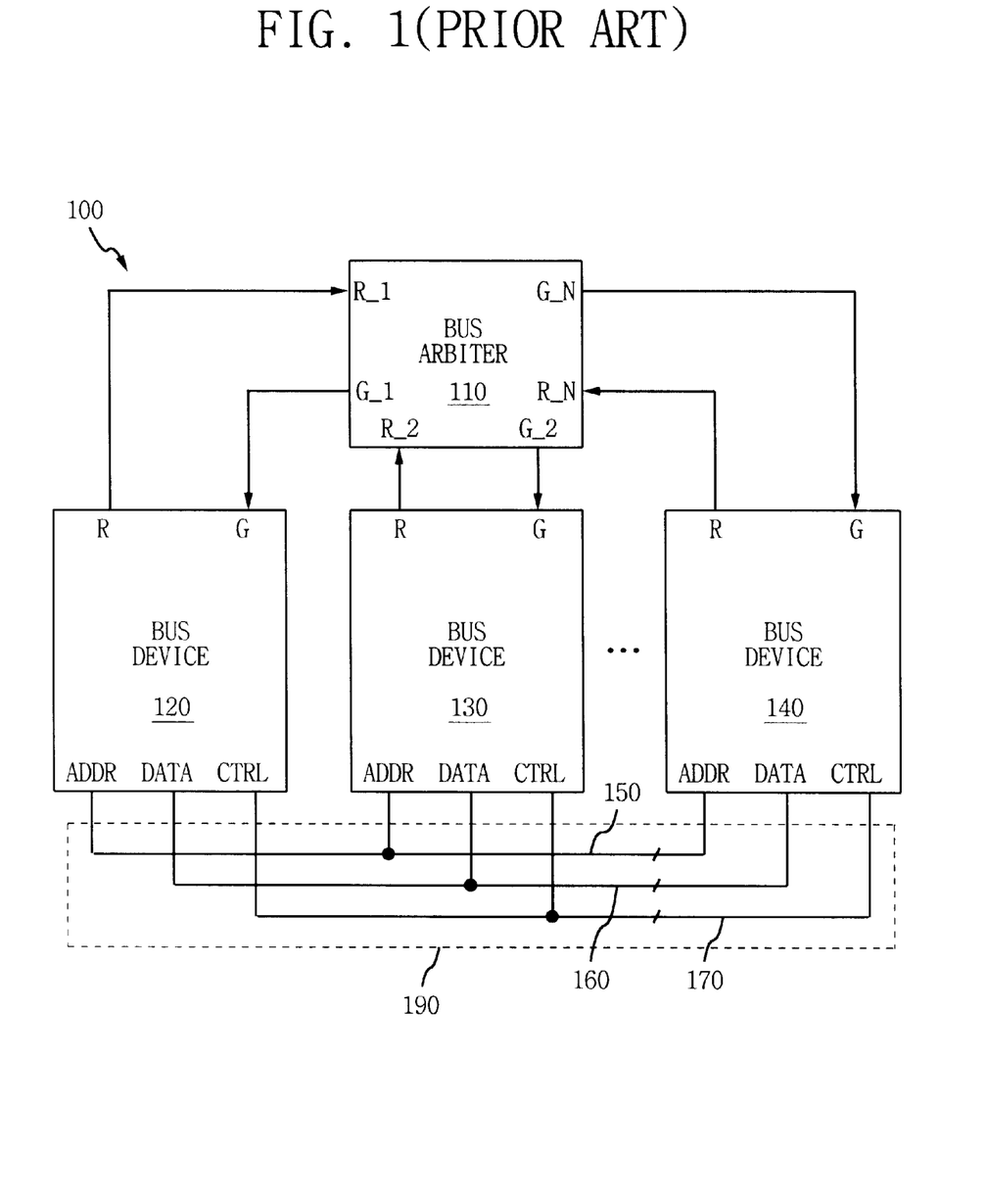
FIG. 1 shows a block diagram of a conventional shared bus system.

FIG. 1 shows a block diagram of a conventional shared bus system 100. Bus device 120, bus device 130, bus device 140, as well as other possible bus devices (not shown) are coupled together by a shared bus 190, which contains an address bus 150, a data bus 160, and a control bus 170. On some shared bus systems, the address values and data values are multiplexed on a single combined address/data bus. Each bus device has a bus request output terminal R, a bus grant input terminal G, address terminals ADDR, data terminals DATA, and control terminals CTRL. The bus request output terminals and bus grant input terminals are coupled to a bus arbiter 110. If bus device 120 wishes to use shared bus 190, bus device 120 must drive a request active state on bus request output terminal R. The signals, specifically the request, grant, and select signals, in the embodiments and timing diagrams described herein use logic high as the active state and logic low as the inactive state; however, logic low is also commonly used as the active state with logic high being the inactive state. Bus arbiter 110 monitors the bus request signal on a corresponding bus request input terminal. Since arbiter 110 has a bus request input terminal for each bus device, the bus request input terminals are labeled R_x, where x is a number corresponding to each bus device. If shared bus 190 is not in use, bus arbiter 110 drives a grant active state on the grant output terminal coupled to grant input terminal G of bus device 120 to a grant active state. If two devices request the bus simultaneously bus arbiter 110 can use a priority scheme to determine which device receives the bus grant.

The use of separate bus request and grant lines for each device is commonly referred to as independent requesting arbitration. Other commonly used arbitration schemes include daisy chaining and polling.

A bus device which is granted the use of the bus is commonly referred to as a bus master. The bus master communicates with another bus device, which is commonly referred to as the bus slave. A bus device may be capable of being a master only, a slave only, or both a master and a slave. If bus device 120 is granted the bus, bus device 120 becomes the bus master. Bus device 120 then drives address bus 150 and control bus 170 through address terminals ADDR and control terminals CTRL, respectively, to initiate a data transfer. Specifically, bus device 120 would drive address signals onto address bus 150 through address terminals ADDR and control signals onto control bus 170 through control terminals CTRL. Control bus 170 can contain control signals which indicate, for example, the size of the data transfer and the direction of data transfer (i.e. a read or a write).

Typically each bus device is given a range of addresses for the various data under control by that bus device. Therefore, when the bus master drives a device address corresponding to the desired bus slave onto address bus 150, each bus device must monitor and decode the device address on address bus 150 to determine whether the device address driven by the bus master matches the device address of the bus device. The bus device with a device address which matches the device address driven by the bus master becomes the bus slave. For example, if bus device 120, currently the bus master, wishes to read data from bus device 140, bus device 120 must drive the device address for bus device 140 onto address bus 150. Every other bus device then decode the address to determine whether the device address driven by bus device 120 matches the address of the bus device. In this example, only bus device 140 finds a matching device address. The time for bus device 140 to decode the address adds to the latency of shared bus 190.

Figure 2:
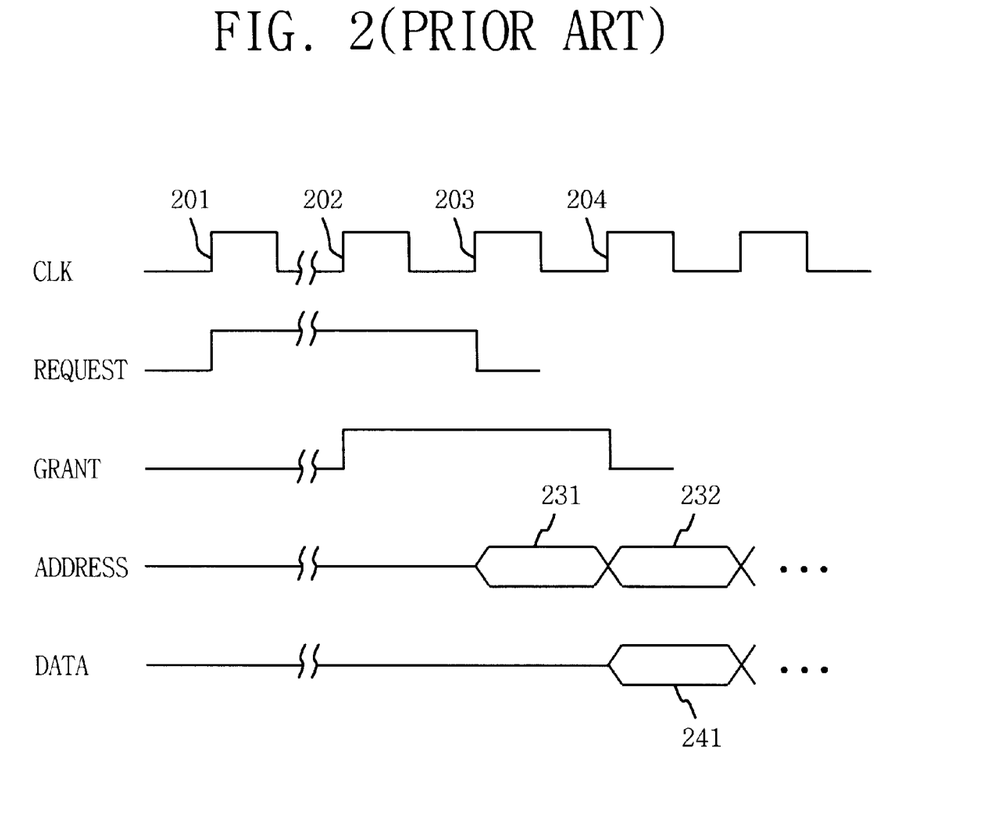
FIG. 2 shows a timing diagram for a conventional shared bus system.

FIG. 2 illustrates the timing of bus arbitration for a typical synchronous shared bus writing data from a bus master to a bus slave. At a first rising edge 201 of clock signal CLK, the requesting bus device drives a request active state on bus request output terminal R, which provides request signal REQUEST to bus arbiter 110. At a later rising edge 202, bus arbiter 110 grants the use of shared bus 190 by driving a grant active state onto the grant output terminal coupled to bus grant input terminal G of the requesting bus device, to provide grant signal GRANT. When the requesting bus device receives a grant active state, the requesting bus device becomes the bus master. At rising edge 203, the bus master drives bus address value 231 on address bus 150, which corresponds to the desired bus slave, to which the bus master wishes to write data. The non master bus devices decode address value 231 to determine which bus device is the desired bus slave. At rising edge 204 of clock signal CLK, the bus master writes address value 232 on address bus 150 and data value 241 on data bus 160. Thus, the selection of the bus slave causes a latency of one clock cycle before data is transferred in a synchronous shared bus system.

A read transfer has similar timing to the write transfer shown in FIG. 2. However, the data would be driven by the bus slave beginning at rising edge 204 of clock signal CLK. If shared bus 190 is used for posted read requests (as explained below), the timing would be identical to FIG. 2 except that no data is written at rising edge 204 of clock signal CLK. Instead at a later time the bus slave will request the use of the bus to respond to the posted read request. Thus, for a posted read request, the latency of bus slave selection accounts for one-third of the total time required for the posted read request.

Depending on the actual implementation of the shared bus 190, other control signals may be beneficial. For example, if each bus device uses data FIFOs as a buffer, status flags such as FIFO full and FIFO empty can be used to indicate whether the bus slave is ready to receive or transmit data. In another bus system a device ready signal may be used on control bus 170.

Another problem with using a shared bus scheme is that only one bus master can use the shared bus at a time. Therefore, if a bus master is waiting for data from a bus slave, other bus devices cannot use the bus. One way to ease the bus contention problem is to use posted read requests. In a posted read request, the bus master sends a read request to a slave and then relinquishes the shared bus. When the bus slave is ready to respond to the read request, the bus slave initiates a request for the bus to send the data to the original bus master.

When the bus slave responds to the read request, the original bus master must determine which posted read request is being answered. A tagging scheme can be used to mark each of the outstanding posted read requests. The circuitry for tagging and identification of responses can be complicated and can add to the latency of the shared bus architecture.

Hence, methods and circuits which reduce the latency of a shared bus architecture are desired. Specifically, the methods or circuits should remove the latency caused by determining the desired bus slave and the complexity due to tagging posted read requests so that a bus device can determine which posted read request is being answered. Furthermore, the circuits should not require excessive board or chip area.

SUMMARY

In accordance with the invention methods and systems reduce latency and tagging requests on a shared bus. More specifically, a device selection scheme in accordance with an embodiment of the invention can reduce the latency of bus arbitration. Furthermore, a transaction ID bus in accordance with an embodiment of the invention, greatly reduces the complexity of tagging posted read requests.

In one embodiment, a bus communication system has a bus arbiter, a first bus device, a second bus device and a shared bus coupling the first bus device to the second bus device. The bus arbiter has a first device select output terminal coupled to a first device select input terminal of the first bus device and a second device select output terminal coupled to a second device select input terminal of the second bus device. The bus arbiter may also contain a first plurality of destination ID input terminals and a second plurality of destination ID input terminals. Each bus device has a plurality of destination ID output terminals coupled to one plurality of destination ID input terminals of the bus arbiter. Furthermore, each bus device has a bus request output terminal coupled to a bus request input terminal of the bus arbiter. In addition, each bus device has a bus grant input terminal coupled to a bus grant output terminal of the bus arbiter. Thus, for each bus device using the shared bus, the bus arbiter has one bus request input terminal, one bus grant output terminal, one device select input terminal, and a plurality of destination ID input terminals.

When the first bus device wishes to use the shared bus to communicate with the second bus device, the first bus device drives a request active state onto the bus request terminal of the first bus device and drives a destination ID value corresponding to the second bus device onto the destination ID output terminals of the first bus device. If the shared bus is not being used, the bus arbiter grants use of the shared bus to the first bus device by driving a grant active state onto the bus grant output terminal coupled to the first bus device and driving a select active state onto the device select output terminal coupled to the second bus device. The first bus device becomes the bus master and the second bus device becomes the bus slave. Since the bus slave is initiated at the same time as the bus master, the bus master does not have to spend time initiating the bus slave. In a synchronous system, at least one clock cycle of latency can be eliminated.

Complexity in tagging posted read requests can be reduced using a transaction ID bus with any shared bus system having a first bus device coupled to a second bus device by a shared bus. The transaction ID bus is also coupled to the first bus device and the second bus device. The bus device which is to be the bus master drives a unique transaction ID value onto the transaction ID bus for each posted read request. The bus device which is to be the bus slave latches the transaction ID value and returns the same transaction ID value onto the transaction ID bus when the bus slave responds to the posted bus request. The bus master can then read the transaction ID value to determine which posted read request is being completed. The bus master can use a counter, which increments with each posted read request, to generate the transaction ID values. The bus slave can use a latch or FIFO to store the transaction ID values as they are sent by the bus master. In some embodiments of the invention, the transaction ID has a requester ID portion and a request transaction ID portion. The bus slave decodes the requestor ID portion to determine which bus device sent the original posted read request.

BRIEF DESCRIPTION OF THE DRAWINGS

Use of the same reference symbols in different figures indicates similar or identical items.

DETAILED DESCRIPTION

According to the principles of this invention, a shared bus architecture eliminates the latency caused by the selection of the bus slave. Furthermore, a unique transaction identification (ID) method and circuit is disclosed to enhance posted read protocol on shared buses without consuming excessive chip or board area.

Figure 3A:
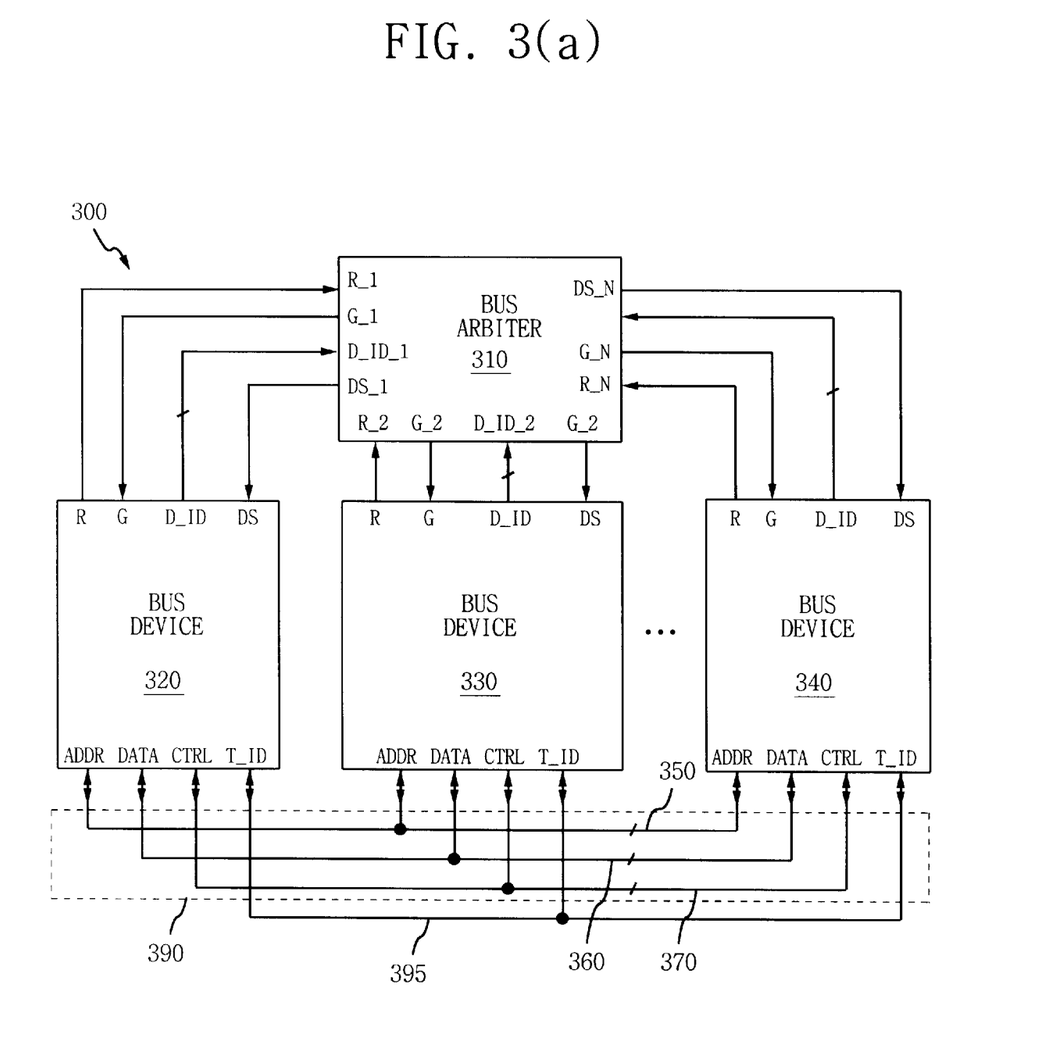
FIG. 3(a) shows a block diagram of a shared bus system in accordance with an embodiment of the invention.

FIG. 3(a) shows a block diagram of a shared bus system 300 in accordance with an embodiment of the invention. The various elements of shared bus system 300 can be, for example, manufactured on a single integrated circuit, manufactured as components on a single printed circuit board, or manufactured using multiple printed circuit boards. In shared bus system 300, various bus devices, such as bus device 320, bus device 330, and bus device 340, share a shared bus 390. In the embodiment of FIG. 3, shared bus 390 contains an address bus 350, a data bus 360, and a control bus 370. Bus system 300 also has an optional transaction ID bus 395. Transaction ID bus 395 is not necessary unless the transaction ID scheme described below is used. Furthermore, in some embodiments of the invention the address and data signals are time multiplexed onto a single address/data bus.

Address bus 350, which is coupled to address terminals ADDR of bus devices 320, 330, and 340, is used to pass the address value of data being requested or written. Data bus 360, which is coupled to the bus devices through data terminals DATA on each bus device, carries data between the bus devices.

Control bus 370, which is coupled to each control terminal CTRL of the bus devices, conveys control signals between the bus devices. Depending on the specific embodiment of shared bus system 300, different control signals are used on control bus 370. For example, in a synchronous design a clock signal CLK is present on control bus 370. In an asynchronous design control signals such as data valid and acknowledge signals may be present on control bus 370. Other commonly used signals which may be present on control bus 370 include, transfer size, read/write, address buffer full, data buffer full, address buffer empty, data buffer empty, device ready, reset, request size, and data ready.

Each bus device using shared bus 390, is coupled to a bus arbiter 310. Specifically, each bus device has a bus request output terminal R to request use of shared bus 390, a bus grant input terminal G to receive a grant signal, destination identification (ID) output terminals D_ID to drive a destination ID to bus arbiter 310, and a device select input terminal DS to receive a device select signal if the bus device is to be the bus slave. Bus arbiter 310 has for each bus device, a bus request input terminal R_x, a bus grant output terminal G_x, destination ID input terminals D_ID_x, and a device select output terminal DS_x, respectively corresponding to the terminals R, G, D_ID, and DS on the bus device. The requesting bus device which receives a grant active state on grant terminal G becomes the bus master.

When making a request, a bus device, such as bus device 320, drives a request active state on bus request output terminal R of bus device 320 and sends a destination ID to bus arbiter 310 via destination ID terminals D_ID of bus device 320. The destination ID is used to indicate which bus device is to become the bus slave. Each bus device is assigned a unique destination ID; therefore, bus arbiter 310 is able to decode the destination ID to determine which bus device is to be the bus slave. For example if bus device 320 wishes to communicate with bus device 340, bus device 320 will send the destination ID of bus device 340 on the destination ID terminals D_ID of bus device 320 with a request active state on bus request output terminal R of bus device 320.

If shared bus 390 is available, bus arbiter 310 grants to bus device 320 the use of shared bus 390 by driving a grant active state on bus grant output terminal G_1 coupled to bus grant input terminal G of bus device 320. Bus arbiter 310 also drives a select active state onto device select output terminal DS_N coupled to device select terminal DS of the desired bus slave. Bus device 320 becomes the bus master and bus device 340 becomes the bus slave. Since bus device 340 receives the device select signal, bus device 340 knows that the next data transfer or data transfer request is directed to bus device 340. Bus device 320, i.e. the bus master of this example, does not have to waste time sending a device address to initiate the bus slave.

Bus arbiter 310 must be able to ascertain the status of the bus, i.e. whether the bus is busy. In one embodiment of the invention, dedicated bus busy terminals are placed on each bus device; when the bus is being used by a bus device, the bus device drives a busy active state onto the bus busy terminal. Bus arbiter 310 can either have an input terminal for each bus busy terminal of each device or all the bus devices can share a common bus busy signal which can only be driven when the device is a bus master. Bus arbiter 313 monitors the bus busy signal to determine when bus 390 is available. In another embodiment of the invention, the bus master uses the bus request signal to signal bus arbiter 310 whether the bus is still being used. Specifically, the bus master maintains a bus active state on bus request output terminal R of the bus master until after the bus master is finished with the bus. Once the bus master is finished, the bus master drives a request inactive state onto the bus master's bus request output terminal R. Thus bus arbiter 310 can monitor the bus request signal of the bus master to determine when the bus is available.

Figure 3B:
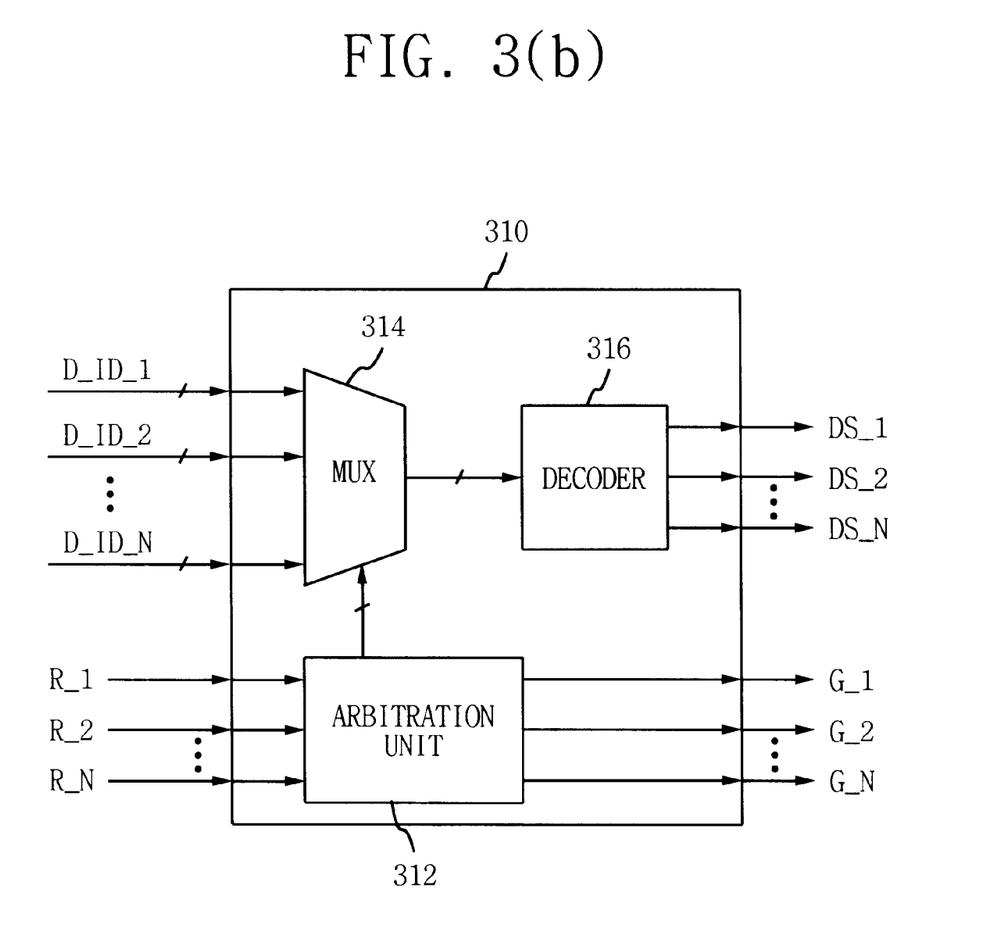
FIG. 3(b) shows a block diagram of a bus arbitration unit in accordance with an embodiment of the invention.

FIG. 3(b) shows one embodiment of bus arbiter 310. Arbitration unit 312 monitors all the bus request input terminals R_x and drives a grant active state onto the appropriate bus grant output terminal G_x based on a priority scheme. Arbitration unit 312 also controls multiplexer 314, which is coupled to the destination ID input terminals D_ID_x, so that multiplexer 314 electrically couples the destination ID terminals of the next bus slave to decoder 316. Decoder 316 decodes the destination ID from multiplexer 314 to drive the device select terminal of the next bus slave.

Figure 4:
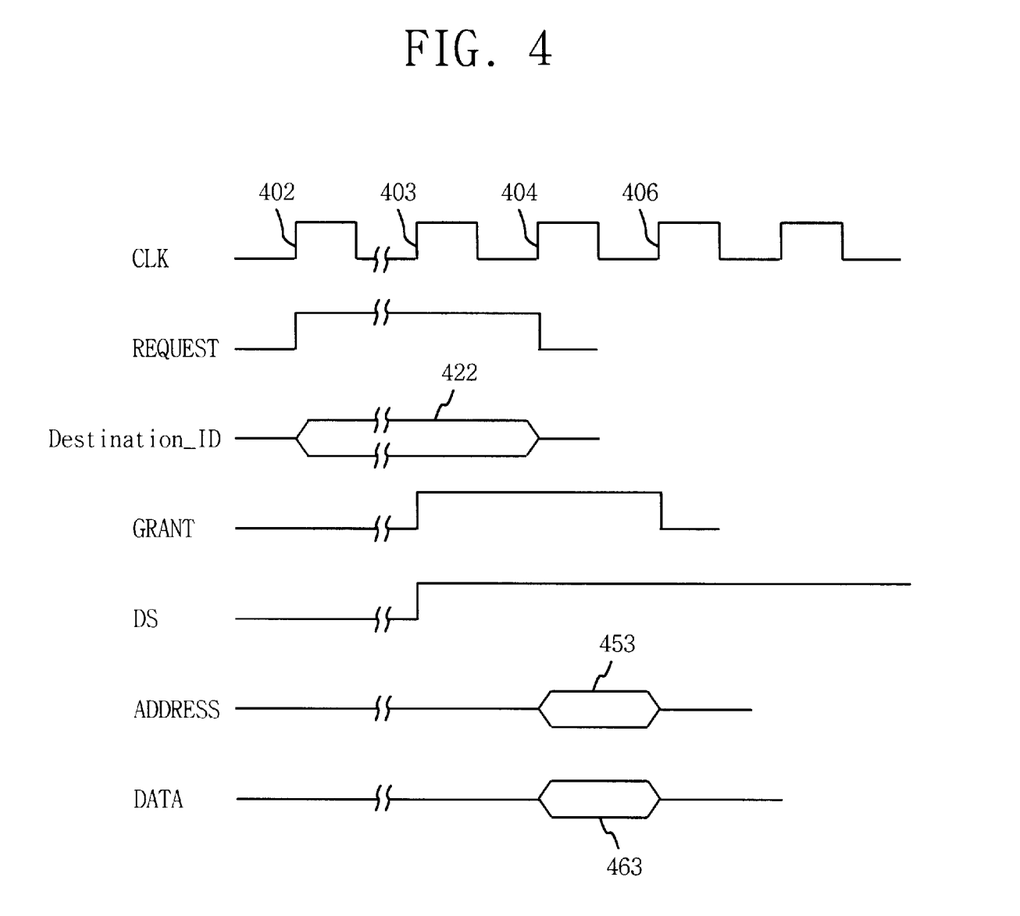
FIG. 4 shows a timing diagram for a shared bus system in accordance with an embodiment of the invention.

FIG. 4 shows the bus arbitration timing of a data write from bus device 340 to bus device 330 on a synchronous shared bus in accordance with one embodiment of the invention. At rising edge 402 of clock signal CLK, bus device 340 drives request signal REQUEST on bus request output terminal R of bus device 340 to a request active state and drives a destination ID 422 indicating the desired bus slave 330 to bus arbiter 310. At a later rising edge 403 of clock signal CLK, bus arbiter 310 drives grant signal GRANT on bus grant input terminal G of bus device 340 to a grant active state. Also at rising edge 403, bus arbiter 310 drives a select active state onto device select input terminal DS of the bus device corresponding to the destination ID sent by bus device 340, in this example bus device 330. Bus device 340 then becomes the bus master of shared bus 390, while bus device 330 becomes the bus slave. Since the bus slave is selected at the same time as the bus master, the bus master can begin to transfer data at next rising edge, i.e. rising edge 404. Therefore, the bus master is able to drive address value 453 onto address bus 350 and data value 463 onto data bus 360 at rising edge 404. Thus, use of a destination ID and device select reduces the latency of shared bus 390 is when compared shared bus 190 of FIG. 1.

If the bus master had wished to read data from the bus slave, the timing would be the same as illustrated in FIG. 4 except the bus slave would write data onto data bus 360 at rising edge 406 of clock signal CLK. A posted read would use the same timing as shown in FIG. 4 except that no data value 463 is sent. At a later time, the current bus slave initiates a write transfer in response to the posted read.

To further reduce the latency of the arbitration of shared bus 390, the grant signal and device select signal from bus arbiter 310 can be made asynchronous. For example, simple combinatorial logic can be used with the request signals and various bus status signals to generate the grant signal. Similarly, simple combinatorial logic can be used to decode the destination ID to generate the device select signals. Thus, if shared bus 390 is not busy when a request is received, bus grant input terminal G of the requesting bus device can be driven to a grant active state during the same clock cycle as the bus request output terminal R was driven to a request active state. Similarly, device select input terminal DS of the desired bus slave is driven to a select active state in the same clock cycle. So long as any set up time constraints that may exist on the bus devices are satisfied, the requesting bus device can use shared bus 390 on the next clock cycle after the request signal was asserted. Some embodiments of the invention use a completely asynchronous bus to further reduce latency.

Figure 5:
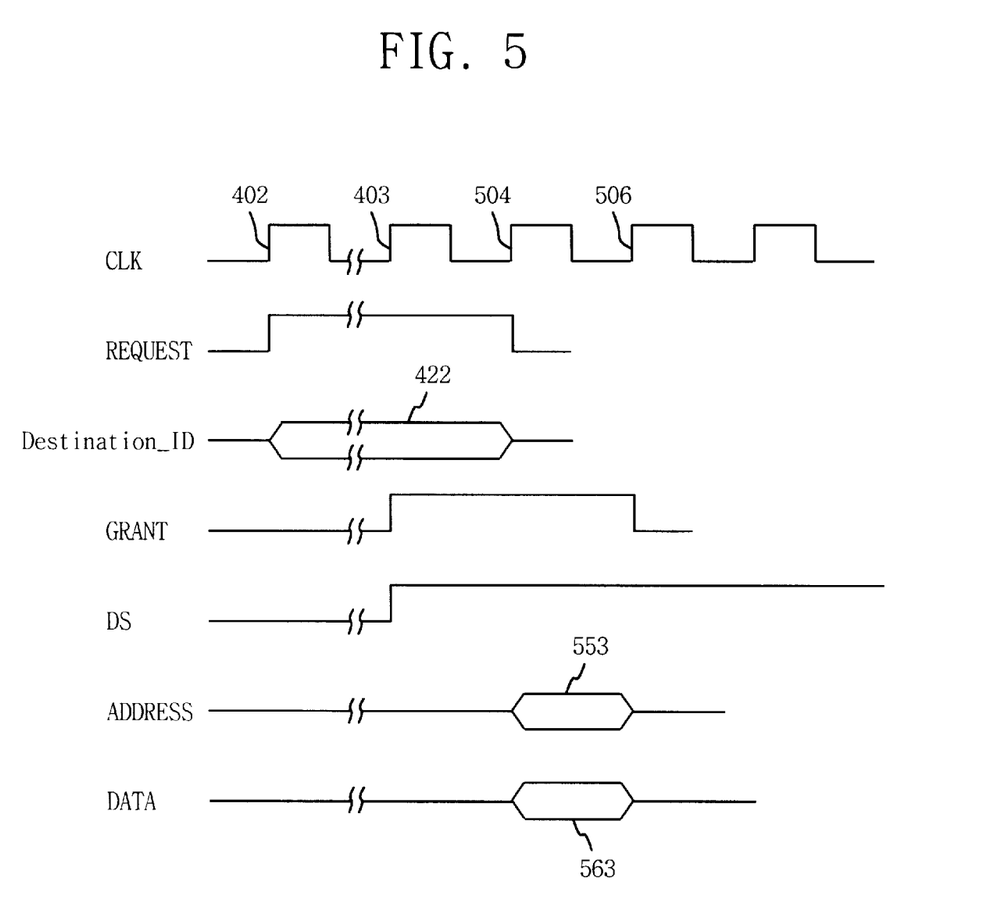
FIG. 5 shows a timing diagram for a posted read request on a shared bus system in accordance with an embodiment of the present invention.

In performing posted reads, transaction ID bus 395 can be used to efficiently tag each posted read request. FIG. 5 shows a timing diagram which illustrates the use of transaction ID bus 395. Since the bus arbitration for a posted read is identical to the data write of FIG. 4, a description of the request, grant and slave selection process occurring according to rising edges 402 and 403 is not repeated. However, at rising edge 504, the bus master drives address value 553 onto address bus 350 and transaction ID value 563 onto transaction ID bus 395. The transaction ID is divided into a requester ID and a request transaction ID. The minimum size of the requester ID is dependent upon the number of bus devices using shared bus 390. Each bus device is assigned a unique requester ID. If transaction ID bus 395 is used with the bus arbitration scheme used in bus system 300, the requester ID can be made equal to the destination ID of each bus device. However, if a transaction ID bus is added to bus system 100, the requester ID can be assigned based on the address of each bus device or any other scheme so long as each bus device has a unique requester ID.

The bus master determines the specific value of the request transaction ID and requests the request transaction ID to tag each request. Each posted read request should receive a unique request transaction ID. However, once a posted read request has been completed, the request transaction ID of the completed posted read request can be reused.

When the bus slave receives the posted read request, the bus slave stores the entire transaction ID along with the address requested. When the bus slave is able to respond to the posted read request, the bus slaves decodes the requester ID to determine which bus device originated the read request. The bus slave then makes a request to use shared bus 390 and sends a copy of the original transaction ID and the requested data to the original bus master. Since the bus master receives a copy of the transaction ID, the bus master can determine which posted read request is being completed.

Figure 6:
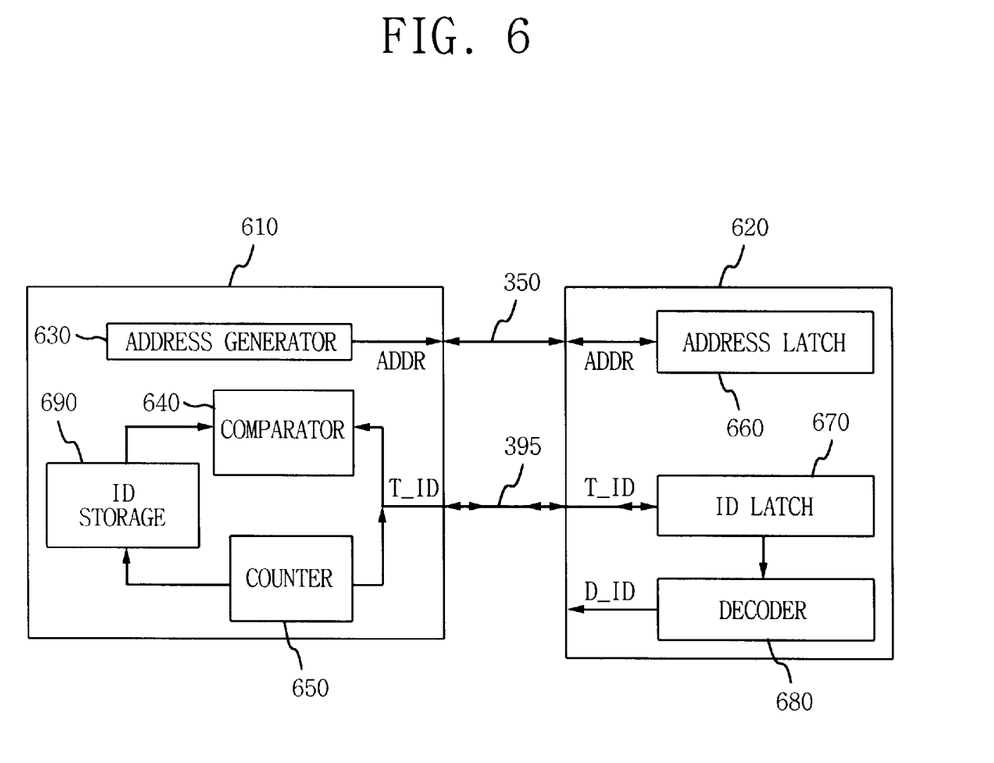
FIG. 6 shows a detailed block diagram of a bus system in accordance with an embodiment of the invention.

FIG. 6 illustrates one embodiment of bus devices capable of using transaction ID bus 395. In FIG. 6, bus master 610 requests data from bus slave 620. Address generator 630 in bus master 610 is used to generate the desired address values on address bus 350. Counter 650 of bus master 610 generates a request transaction ID. For each posted read request, counter 650 increments the request transaction ID by one. Therefore, as long as counter 650 is large enough to guarantee that rollover of counter 650 does not occur before a posted read must be completed, each posted read request receives a different request transaction ID. The output of counter 650 along with the requester ID of bus master 610 is driven onto transaction ID bus 395. The output of counter 650 is also sent to ID storage 690 which stores the request transaction IDs of outstanding posted read requests. The number of outstanding posted read requests is limited by the number of request transaction IDs that can be stored in ID storage 690. Bus master 610 uses comparator 640, which receives the incoming transaction ID from bus slave 620 on transaction bus 395, to compare the incoming request transaction ID with the request transaction IDs stored in ID storage 690 to determine which posted read request is being completed.

Bus slave 620 stores the posted read request from bus master 610. Address latch 660 stores the requested address from address bus 350. ID latch 670 stores the transaction ID from transaction ID bus 395. When the data indicated by the stored address is available, decoder 680 decodes the requester ID portion of the transaction ID from ID latch 670 to determine which bus device made the posted read request. If the bus arbitration scheme of bus system 300 is used, decoder 680 drives the appropriate destination ID onto destination ID terminals D_ID of bus slave 620 (bus slave 620 becomes the bus master when responding to the posted read request). If a conventional bus arbitration scheme is used decoder 680 provides the appropriate address for the bus master to an address generator (not shown).

Figure 7:
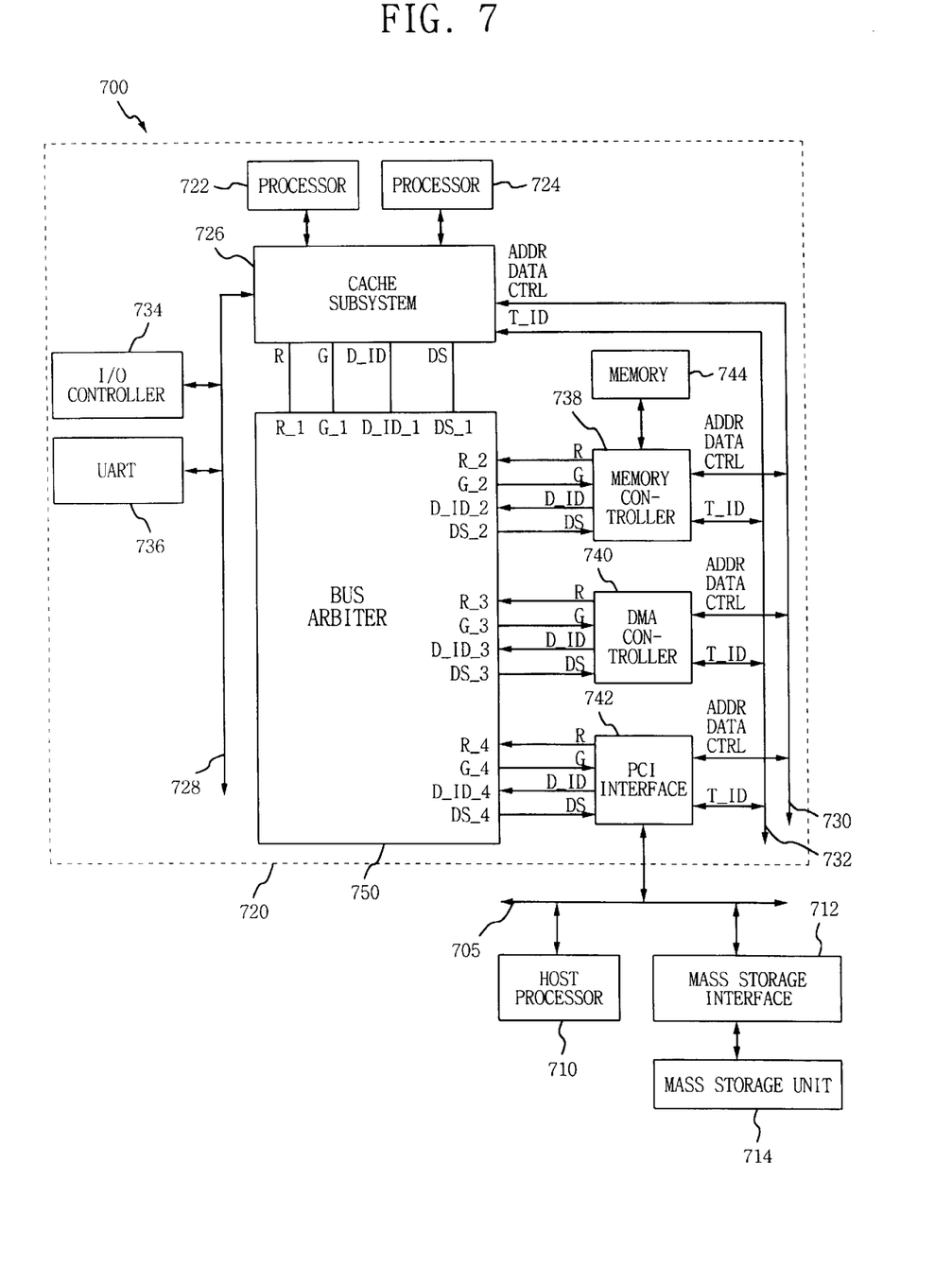
FIG. 7 is a block diagram of a computer system using destination ID bus arbitration and transaction ID request tagging in accordance with one embodiment of the invention.

FIG. 7 shows a detailed block diagram of a computer system 700 incorporating destination ID bus arbitration and transaction ID request tagging in accordance with one embodiment of the invention. Specifically, host computer 700 has a host processor 710, for example an x 86 compatible processor, coupled to a standard PCI bus 705. Mass storage unit 714 is coupled to PCI bus 705 through a mass storage interface 712. Mass storage unit 714 can be for example magnetic disk drives, CD-ROMS, magneto-optical disks, or magnetic tapes. A co-processing system 720 is also coupled to PCI bus 705 using a PCI interface 742. Co-processing system 720 is for example a multimedia signal processor. In the embodiment of FIG. 7, co-processing unit 720 has a first CPU 722 and a second CPU 724 coupled to a cache subsystem 726. In one embodiment of co-processing system 720, processor 722 is an ARM7 microprocessor and processor 724 is a vector co-processor.

Cache subsystem 726 is coupled to a first shared bus 728, a second shared bus 730, and a transaction ID bus 732. Shared bus 728 is used for slow speed devices such as I/O controller 734 and UART (Universal asynchronous receiver/transmitter) 736. Shared bus 730 is used for high speed devices such as memory controller 738, DMA controller 740, and PCI interface 742.

Shared bus 730 uses a destination ID cache arbitration system as described above. Cache subsystem 726, memory controller 738, DMA controller 740, and PCI interface 742 are all bus devices. Bus arbiter 750, which is coupled to the bus devices, performs bus arbitration as described above.

The bus devices also use transaction ID bus 732 for transaction request tagging as described above.

The specific embodiments of the various bus devices are not relevant to the invention. However, for further details on DMA controllers please see co-filed, U.S. patent application Ser. No. 08/733,411 entitled "DMA CONTROLLER WHICH RECEIVES SIZE DATA FOR EACH DMA CHANNEL" of Amjad Z. Qureshi, et al., co-filed U.S. patent application Ser. No. 08/733,902, entitled "SIMULTANEOUS DATA TRANSFER THROUGH READ AND WRITE BUFFERS OF A DMA CONTROLLER" of Kab Ju Moon, et al., and co-filed U.S. patent application Ser. No. 08/730,611, entitled "DMA CONTROLLER WITH CHANNEL TAGGING" of Kab Ju Moon, et al. The subject matter of the three applications listed above is incorporated herein by reference in their entirety. For further details on a PCI controller, see for example, co-filed U.S. patent application Ser. No. 08/730,913, entitled "PCI INTERFACE SYNCHRONIZATION" of Kevin Chiang, et al., which is herein incorporated by reference in its entirety. For further detail on cache controllers, see for example, U.S. patent application Ser. No. 08/697,102, entitled "MULTIPROCESSOR OPERATION IN A MULTIMEDIA SIGNAL PROCESSOR" of Le Trong Nguyen, which is herein incorporated by reference in its entirety.

The various embodiments of the structure of this invention that are described above are illustrative only of the principles of this invention and are not intended to limit the scope of the invention to the particular embodiments described. In view of this disclosure, those skilled-in-the-art can define within the scope of the invention other implementations of buses, transaction ID generators, control buses, latches, FIFOs, bus devices, bus arbiters, control lines, and use these alternative features to create a low latency shared bus system.

We claim:

1. A bus communication system comprising:

a shared bus;

a transaction ID bus;

a plurality of bus devices coupled to the shared bus and the transaction ID bus, wherein the transaction ID bus receives a transaction ID value for a posted read request, and wherein the transaction ID value comprises a requester ID value and a request transaction ID value; and a bus arbiter having:
an arbitration unit coupled to receive a plurality of request signals from the bus devices and to provide a grant signal to select from the plurality of bus devices a first bus device to act as a bus master for the shared bus; and
a selection circuit coupled to receive device identification signals from the bus devices and to provide a device select signal to the bus devices, wherein the selection circuit asserts the device select signal to select from the plurality of the bus devices a second bus device to act as a bus slave on the shared bus, and wherein the first bus device drives a first bus request signal and a first plurality of device identification signals concurrently.

2. The bus communication system of claim 1, wherein the selection circuit selects the second bus device to correspond to the device identification signals from the first bus device.

3. The bus communication system of claim 1, wherein said bus arbiter provides the grant signal and the device select signal concurrently.

4. The bus communication system of claim 1, wherein said shared bus comprises an address bus, a data bus, and a control bus.

5. The bus communication system of claim 1, wherein said second bus device comprises a FIFO buffer coupled to store a plurality of values of said transaction ID from said transaction ID bus.

6. A bus communication system comprising:

a shared bus;

a transaction ID bus;

a plurality of bus devices coupled to the shared bus and the transaction ID bus; and a bus arbiter having:
an arbitration unit coupled to receive a plurality of request signals from the bus devices and to provide a grant signal to select from the plurality of bus devices a first bus device to act as a bus master for the shared bus, and wherein said first bus device comprises a counter coupled to generate a transaction ID on said transaction ID bus; and
a selection circuit coupled to receive device identification signals from the bus devices and to provide a device select signal to the bus devices, wherein the selection circuit asserts the device select signal to select from the plurality of the bus devices a second bus device to act as a bus slave on the shared bus, and wherein the first bus device drives a first bus request signal and a first plurality of device identification signals concurrently.

7. A bus communication system comprising:

a shared bus;

a transaction ID bus;

a plurality of bus devices coupled to the shared bus and the transaction ID bus; and a bus arbiter having:
an arbitration unit coupled to receive a plurality of request signals from the bus devices and to provide a grant signal to select from the plurality of bus devices a first bus device to act as a bus master for the shared bus; and
a selection circuit coupled to receive device identification signals from the bus devices and to provide a device select signal to the bus devices, wherein the selection circuit asserts the device select signal to select from the plurality of the bus devices a second bus device to act as a bus slave on the shared bus, wherein the first bus device drives a first bus request signal and a first plurality of device identification signals concurrently, and wherein said second bus device comprises an ID latch coupled to store a transaction ID on said transaction ID bus.

8. A bus communication system comprising:

a first bus device;

a second bus device;

a shared bus for transferring address and data coupling said first bus device to said second bus device; and a transaction ID bus for transferring transaction ID values coupling said first bus device to said second bus device, wherein said first bus device drives a first transation ID value to said second bus device on said transaction ID bus during a read request, and wherein said first bus device further comprises a counter coupled to provide a count value as at least a portion of a transaction ID value carried by said transaction ID bus.

9. The bus communication system of claim 8, where said first bus device further comprises:

a comparator coupled to said transaction ID bus; and a storage element having a write port coupled to said counter and a read port coupled to said comparator.

10. A bus communication system comprising:

a first bus device;

a second bus device;

a shared bus for transferring address and data coupling said first bus device to said second bus device; and a transaction ID bus for transferring transaction ID values coupling said first bus device to said second bus device, wherein said first bus device drives a first transaction ID value to said second bus device on said transaction ID bus during a read request, and wherein said second bus device further comprises a latch coupled to latch and store a transaction ID value from said transaction ID bus, wherein said second bus device further comprises a decoder coupled to said latch.

11. The bus communication system of claim 1, wherein said second bus device further comprises a FIFO coupled to store transaction ID values from said transaction ID bus.

12. The bus communication system of claim 11, wherein said second bus device further comprises a decoder coupled to said FIFO.

13. The bus communication system of claim 1, wherein said second bus device drives said first transaction ID values to said first bus device on said transaction ID during a response to said posted read request.

* * * * *